May 15, 1962  E. G. CHARTIER  3,035,194
ELECTRIC CLOCK MOTOR
Filed Aug. 21, 1958  2 Sheets-Sheet 1
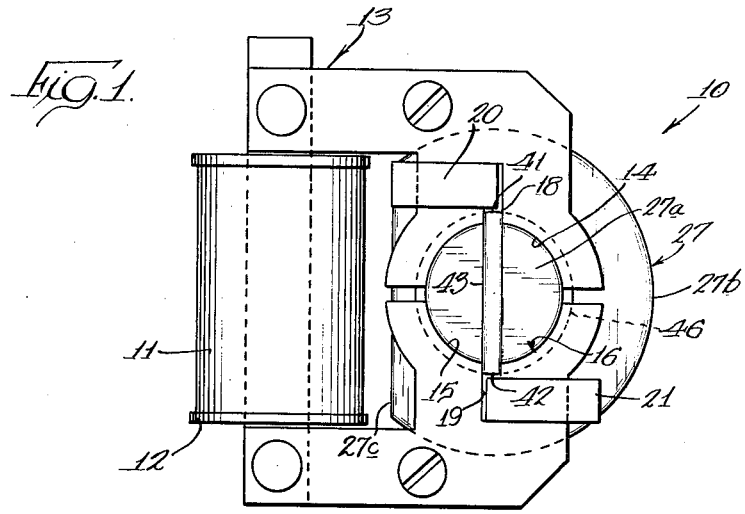
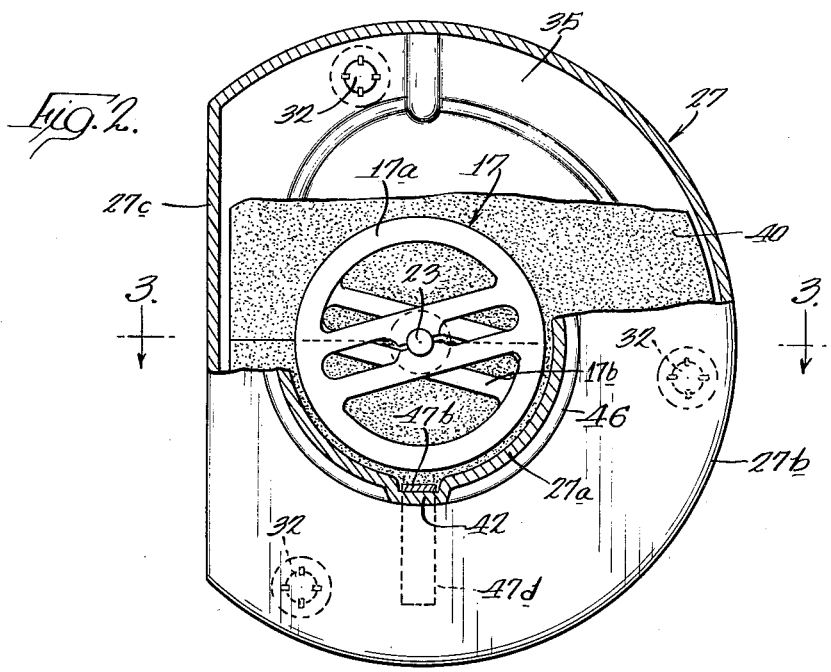
INVENTOR.
Edmund G. Chartier
BY
George R. Clark
Atty.

May 15, 1962
E. G. CHARTIER
3,035,194
ELECTRIC CLOCK MOTOR
Filed Aug. 21, 1958
2 Sheets-Sheet 2
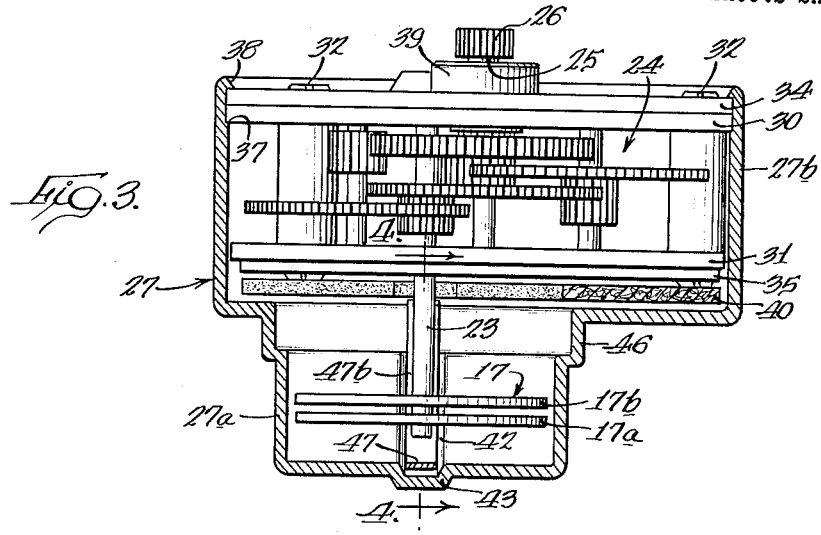
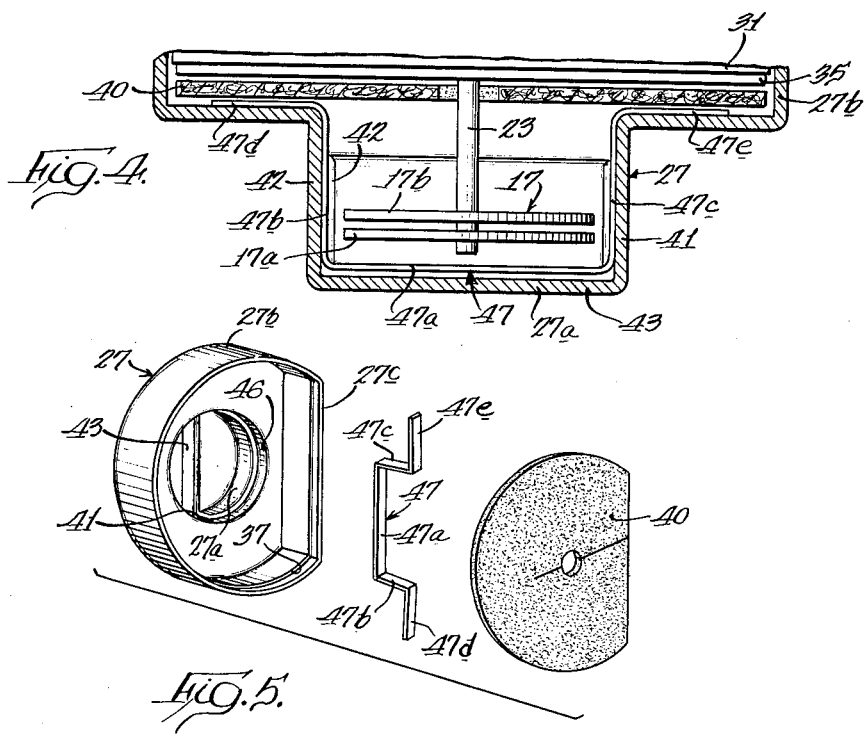
INVENTOR.
Edmund G. Chartier
BY
George R. Clark
Atty.

United States Patent Office 3,035,194
Patented May 15, 1962

3,035,194
ELECTRIC CLOCK MOTOR
Edmund G. Chartier, Elmhurst, Ill., assignor to Sunbeam Corporation, Chicago, Ill., a corporation of Illinois
Filed Aug. 21, 1958, Ser. No. 756,416
10 Claims. (Cl. 310—162)

The present invention relates to motors, and more particularly to small synchronous motors especially adapted for powering electric clocks. Specifically, the present invention is an improvement on a copending Chartier and Wickenberg application Serial No. 688,467, filed October 7, 1957, and assigned to the same assignee as the present application.

In the above-mentioned copending application there is disclosed and claimed an electric clock including an improved clock motor which is very small and compact and yet which produces a substantially higher torque than prior art motors of greater size. Such motors comprise a sealed housing having a bosslike projection of circular cross-section which is insertable into a cooperating opening provided in a suitable magnetic field structure. By virtue of the features of the invention covered by the above-mentioned copending application, the space between the rotor and the walls defining the bosslike structure is substantially less than was heretofore possible.

In such small electric clock motors, a lubricating fluid is included in the sealed casing, primarily for the purpose of lubricating the gear train incorporated in such motors. During normal operation such lubricating fluid is maintained in the portion of the sealed housing containing the gear train, but when such clocks incorporating such motors are shipped the lubricating fluid often enters the bosslike projection or rotor chamber where it would provide a substantial drag on the rotor. Consequently, in such motors, means have been provided for removing the oil from the portion of the housing containing the rotor. The oil removal devices heretofore used require a substantial space between the rotor and the portion of the housing, generally a bosslike projection, enclosing the same, and hence are unsatisfactory with motors of the type disclosed in the above-mentioned copending application where such space has become very small. It would be desirable, therefore, to retain all the features of the motor of the above-mentioned application and yet provide an oil removal device which would function satisfactorily without increasing the space between the rotor and the portion of the housing enclosing the same.

Accordingly, it is an object of the present invention to provide a new and improved electric motor particularly adapted for powering an electric clock.

It is another object of the present invention to provide improved means for keeping the rotor portion of an electric motor free from lubricating fluid.

Still another object of the present invention is to provide an electric clock motor of small size but very high torque which will operate satisfactorily under all conditions.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is an elevational view of an electric motor embodying the present invention;

FIG. 2 is an end view of the housing for the rotor and gear mechanism of the electric motor of the present invention with certain portions of the housing cut away to show the end of the rotor;

FIG. 3 is a sectional view taken on line 3—3 of FIG. 2, assuming that FIG. 2 shows the complete structure;

FIG. 4 is a fragmentary sectional view taken on line 4—4 of FIG. 3, again assuming that FIG. 3 shows the complete structure; and FIG. 5 is an exploded perspective view of certain elements of the clock motor of the present invention.

Briefly, the present invention is concerned with an oil removal arrangement for an electric clock motor of the type wherein the space between the rotor and the housing therefor is very small without in any way increasing this space. Specifically, capillary means are provided which extend outwardly of the housing into a space provided in the pole faces for another function instead of being spaced between the pole faces and the armature as in prior art arrangements.

Referring now to the drawings, there is illustrated in FIG. 1 an electric motor generally designated by the reference numeral 10 which may be substantially identical with the electric motor disclosed and claimed in the above-mentioned copending application. This motor is a self-starting synchronous motor of relatively simple and inexpensive type. As illustrated, the motor 10 comprises a single phase shaded pole motor having a single phase energizing winding 11. This winding is suitably wound upon an insulated bobbin 12, and the winding and bobbin surround one leg of a rectangular core 13, which core comprises a plurality of laminations, as is fully disclosed in the above-mentioned copending application. The laminated core 13 on the leg thereof opposite the leg that is encompassed by the winding 11 terminates in a pair of pole faces 14 and 15, each of which is divided or split into two sections. The pole faces 14 and 15 are of curved configuration so as to define a circular opening 16 therebetween for receiving therein a suitable rotor or motor armature generally designated at 17. The pole faces 14 and 15 are each divided into two sections by splitting the pole piece which terminates in these pole faces. To this end there is provided a notch 18 in the pole piece 14 and a similar notch 19 in the pole piece 15. A shading coil 20 is provided on one half of the pole piece which terminates in the pole face 14, while a shading coil 21 is provided around the other half of the pole piece terminating in the pole face 15. The shading coils 20 and 21 extend into the notches 18 and 19, respectively. It will be appreciated that by virtue of the shading coils 20 and 21 shading a portion of the flux in each pole piece, the alternating current flux in the laminated core 13 is changed into a flux having a rotating component directed through the rotor or armature 17. It will be understood that the shaded pole motor described thus far is effectively a two-pole motor with a synchronous rotor speed of 3600 revolutions per minute.

With a conventional electric clock it is usually desirable to provide a sweep second hand which rotates at one revolution per minute. Consequently, the output of the synchronous motor 10 should have a speed considerably reduced from 3600 revolutions per minute so that with a single gear connection a sweep second hand may be driven directly therefrom. To this end there is provided a rotor shaft 23 to which is secured the rotor 17. The rotor shaft 23 is drivingly connected through a gear train generally designated at 24 to an output shaft 25 which may be provided with a suitable gear 26. The construction of the gear train 24 forms no part of the present invention and is fully disclosed in the copending application referred to above.

For the purpose of insuring long life and, furthermore, for completely protecting the rotor 17, the rotor shaft 23 and the gear train 24 including the output shaft 25, there is preferably provided a completely sealed rotor and gear casing or housing generally designated at 27. This housing is preferably formed of nonmagnetic material such as aluminum or the like so as not to affect the magnetic flux passing between the pole faces 14 and 15 of the magnetic structure 13 and through the rotor 17. As illustrated, the housing 27 comprises a first bosslike cylindrical section 27a having an exterior diameter so as to snugly fit within the circular opening 16 between the pole faces 14 and 15 of the magnetic structure 13. The housing 27 further includes a main section 27b which has a flattened portion 27c (best shown in FIGS. 2 and 5) thereby to hold the size of the housing to a minimum. The portions 27a and 27b of the housing 27 are aligned along an axis centered in the bosslike portion 27a, and the rotor shaft 23 is disposed on this central axis through the housing 27. Initially, the housing 27 is open at the end thereof remote from the bosslike portion 27a so that effectively it is a sort of cup-shaped housing with a protrusion of reduced cross section 27a at the end opposite the open end.

To support the rotor 23 and the gear train 24 in a unitary assembly which can readily be inserted within the housing 27, there are provided a front bearing plate 30 and a rear bearing plate 31 which are held in spaced parallel relationship by a plurality of spacer posts 32. The rotor shaft 23 is suitably journaled in aligned bearings in bearing plates 31 and 32.

It will be appreciated that the output shaft 25 is also suitably journaled in these bearing plates as are numerous other shafts comprising the gear train 24, the details of which are fully discussed in the above-mentioned copending application. A pair of retaining plates 34 and 35 are provided which comprise front and rear retainer plates, respectively. These plates receive the ends of the posts 32 which may be staked or otherwise deformed so as to retain the entire assembly in the manner shown in FIG. 3 of the drawings.

As is fully described in the above-mentioned copending application, the rotor 17 comprises two disklike members 17a and 17b, each formed of a special magnetic steel. These disklike members 17a and 17b are identical and comprise a continuous or unbroken outer ring and a spider arrangement in the form of two parallel bars extending across the ring. The space between the parallel bars is enlarged at the center to receive therein the rotor shaft 23. The inherent resilience of the cross bars tends to lock the associated disks 17a and 17b to the armature shaft 23. The two disks 17a and 17b are disposed angularly as is clearly shown in FIG. 2 of the drawings, and preferably as disclosed and claimed in the above-mentioned copending application, this displacement being of the order of 35°. It is desirable for such a motor to have a reasonably high starting torque as well as a high running torque. Maximum starting torque is obtained when the rotors 17a and 17b are displaced by 45°, and maximum running torque is obtained when the rotors are in the same phase relationship or same angular position. The selected angle of 35° provides very satisfactory operation.

With the motor of the present invention the air gap between the rotor 17 and the pole faces 14 and 15 may be reduced to between twelve and twenty thousandths of an inch as contrasted with forty to sixty thousandths of an inch in arrangements prior to the invention disclosed and claimed in the copending application mentioned above. In order to obtain this much smaller air gap, it is important that the rotor 17 be accurately positioned within the bosslike projection 27a, and, of course, that the housing 27 be accurately positioned within the opening 16 in the field structure 13. The positioning of the portion 27a within the opening 16 is simple, since a relatively snug fit is provided. To insure accurate positioning of the rotor 17 concentrically with the bosslike projection 27a, the open end of the housing 27 is provided with an accurately defined shoulder 37 (FIG. 3) which may be produced by swaging the peripheral portion of the open end of the housing to reduce the thickness thereof. This accurately defined shoulder 37 is then adapted to be engaged by the front bearing plate 30 which is shaped to snugly fit the swaged portion of the housing 27 defining the shoulder 37. With this arrangement accurate centering of the rotor 17 relative to the bosslike portion 27a is assured and, consequently, accurate centering of the rotor 17 with respect to the opening 16 in the magnetic structure 13 is also assured.

The housing 27 is preferably sealed against the entrance of moisture or other foreign matter by crimping, as indicated at 38, the open end thereof over the retainer plate 34. The crimping 38 holds the assembly comprising the plates 30, 31, 34 and 35 and the posts 32 with the associated shafts and gear train accurately positioned within the housing 27 as determined by the shoulder 37. If desired, a suitable adhesive cement may be provided around the crimped portion 38. It will be apparent that, except for the output shaft 25 protruding through the front retainer plate 35, the casing 27 is completely sealed. A suitable seal is preferably also provided between the shaft 25 and a suitable output shaft bushing 39. This bushing preferably extends outside the housing 27 so that it may be used accurately to locate the housing relative to the mechanism to be driven from the output shaft 25 and specifically the gear 26.

For the purpose of satisfactorily lubricating the gear mechanism 24, a suitable lubricant is placed within the housing 27 before the sealing operation described above. In a device built in accordance with the present invention, 0.79 gram of a lubricating fluid was inserted into the housing 27 and the housing then spun in a suitable centrifuge to cause the oil to be distributed throughout the mechanism, and particularly throughout the gear train 24. It will be appreciated that if such a clock mechanism is permitted to lie on the end of the boss 27a for a long period of time this oil will gradually drain into the boss portion 27a. It is necessary to provide some means which will insure that this oil does not remain in the boss portion 27a after the motor is installed in a suitable mechanism such as a clock and the motor is energized to operate such clock, since otherwise this oil or lubricant would provide too much of a drag on the rotor 17. To partially accomplish this oil removal function, there is provided a felt pad or oil retainer 40 which has the same shape as the cross section of the portion 27b of the housing 27. This is clearly shown in FIG. 5 of the drawings. This felt disk 40 is disposed between the portion of housing 27 connecting the sections 27a and 27b and the rear retaining plate 35. When the motor 10 is in operative position, which is the position with the shaft 23 horizontal, the felt pad 40 removes, by capillary action, oil which may have moved into the housing section 27a and returns this oil to the main housing section 27b in which the gear train 24 is disposed.

In accordance with the present invention there is provided additional oil removal means which does not require any increase in the size of the housing 27, and particularly no increase in the air gap between the rotor 17 and the field structure 13. To this end, the housing portion 27a is provided with a pair of diametrically opposed outwardly directed deformations 41 and 42 which are connected by a similar deformation 43 extending across the closed end of the bosslike projection 27a. These deformations effectively provide a groove extending down one side of the boss 27a across the bottom and up the other side. In accordance with the present invention, these projections 41 and 42 are adapted to be disposed within the notches 18 and 19 already provided in the magnetic structure 13 for the shading poles 20 and 21, respectively. Consequently, no increase in air gap occurs. In order that these grooves may be defined by a simple drawing operation without injuring the housing 27, the ends of these grooves preferably terminate in a slightly enlarged annular groove defined by an annular protrusion 46 disposed at the entrance to the bosslike projection 27a.

Thus the grooves defined by projections 41 and 42 enter an enlarged annular recess of the same depth.

To provide a satisfactory capillary action, there is provided a somewhat U-shaped metal strip 47 which is disposed within the grooves defined by the deformations 41, 42 and 43. In other words, the bight portion 47a of the member 47 is disposed in the groove defined by the deformation 43, the leg portions 47b and 47c of the member are disposed within the grooves defined by the deformations 42 and 41, respectively, and projecting flanges 47d and 47e of the member 47 are disposed to extend across the ends of the housing portion 27b beneath the felt disk 40. The member 47 must be formed from a nonmagnetic material which is compatible both with the metal from which the housing 27 is made and also with the lubricating fluid employed. In a device built in accordance with the present invention, the member 47 was made of copper which is nonmagnetic and which is compatible both with the aluminum housing 27 and with the lubricating fluid employed therein. It has been found that with all the lubricating fluid within the portion 27a of the housing 27 the capillary action provided between the member 47 and the grooves defined in the bosslike portion 27a is such as to cause all of the lubricating fluid to move out of the housing portion 27b into the housing portion 27a at least until the felt pad 40 is saturated with oil. Even with the wick or felt member 40 saturated, it has been found that when the clock motor is energized the leg portions 47b and 47c of the member 47 tend to break up any oil film which might otherwise cling to the rotor 17. As a matter of fact, it has been found that within a fraction of a minute the action of member 47 will eliminate this oil and completely remove it from the portion 27a of the housing 27. Thus the oil drag causing the motor to operate at subsynchronous speed will be eliminated within a fraction of a minute.

In view of the detailed description included above, the operation of the device embodying the present invention will be readily understood by those skilled in the art and no further discussion will be included herewith. It will be appreciated that with the present arrangement sufficient lubrication may be incorporated in the sealed motor housing to lubricate the device for many years of operation, and yet even with the compact construction and the minimum space between the rotor and the field structure such lubrication will not adversely affect the operation of the motor.

While there has been illustrated and described a single embodiment of the present invention, it will be understood that numerous changes and modifications will occur to those skilled in the art and it is intended in the appended claims to cover all those changes and modifications which fall within the true spirit and scope of the present invention.

What is claimed as new and desired to be secured by Letters Patent of the United States is:

1. An electric motor comprising a fluidtight housing having a cylindrical portion, a rotatable armature disposed in said cylindrical portion and concentric therewith, the space between the periphery of said armature and the walls of said housing being maintained at a minimum, a field structure having a circular opening defined therein to receive said cylindrical portion in close fitting relationship whereby the space between the periphery of said armature and said field structure is maintained at a minimum, a lubricating fluid contained in said housing, means defining a groove in the wall of said cylindrical portion extending in the direction of the longitudinal axis of said cylindrical portion, and a striplike member in said groove to define a capillary space between the walls of said groove and said striplike member.

2. A synchronous clock motor comprising a fluidtight housing having a cylindrical bosslike projection at one end thereof, a rotatable armature disposed in said cylindrical projection and concentric therewith, the space between the periphery of said armature and the walls defining said projection being maintained at a minimum, a field structure having a circular opening defined therein to receive said cylindrical projection in close fitting relationship whereby the space between the periphery of said armature and said field structure is maintained at a minimum, a lubricating fluid contained in said housing, means defining a groove in the wall of said cylindrical projection extending in the direction of the longitudinal axis of said cylindrical portion, and a striplike member in said groove to define a capillary space between the walls of said groove and said striplike member.

3. In an electric motor the combination of a fluidtight housing having a cylindrical portion, a rotatable armature disposed in said cylindrical portion and concentric therewith, the space between the periphery of said armature and the walls of said housing being maintained at a minimum, a field structure having a circular opening defined therein to receive said cylindrical portion in close fitting relationship whereby the space between the periphery of said armature and said field structure is maintained at a minimum, a lubricating fluid contained in said housing, means defining a pair of diametrically opposed parallel grooves in the wall of said cylindrical portion extending in the direction of the longitudinal axis of said cylindrical portion, a pair of striplike members disposed one in each of said grooves to define capillary spaces between the walls of said grooves and said striplike members, and means integral with said striplike members for interconnecting them as a single unit.

4. An electric motor comprising an oiltight housing having a bosslike projection at one end thereof, a rotatable armature disposed in said bosslike projection and concentric therewith, the space between said armature and bosslike projection being between twelve and twenty thousandths of an inch, a field structure having an opening defined therein to receive said bosslike projection and hence said armature therein, a lubricating fluid contained in said housing, means defining a groove extending along the longitudinal axis of said bosslike projection, and a striplike member in said groove to define a capillary space between the walls of said groove and said striplike member.

5. In an electric motor the combination of a field structure defining a circular opening, a pair of notchlike spaces in said field structure arranged in diametrically opposed relationship relative to said opening with each notchlike space connected to said opening, a rotatable armature for said motor disposed within said opening, a sealed casing of nonmagnetic material having a cylindrical portion snugly received in said opening and enclosing said armature, a pair of diametrically opposed grooves defined by projections formed in the cylindrical portion of said casing, said projections being received within said notchlike spaces, and a strip of nonmagnetic material disposed in each of said grooves to define capillary spaces with at least one wall defining said grooves to remove lubricating fluid from said cylindrical portion.

6. The electric motor of claim 5 wherein said grooves are connected to a circumferential groove defined by an annular projection surrounding said cylindrical portion at a position not disposed within said opening in said field structure.

7. A two-pole synchronous electric motor of the shaded pole type comprising a field structure defining an opening of circular cross-section, a notch in each pole of said field structure dividing each pole adjacent said opening into two portions, said notches being arranged in diametrically opposed relationship relative to said opening, a shading coil for each of the poles of said motor, the respective shading coil for each pole being disposed in a portion of the notch for the respective pole and enclosing only one portion of said two portions of the pole, a rotatable armature for said motor disposed within said opening, a sealed casing of nonmagnetic material having a cylindrical portion snugly received in said opening and enclosing said armature, a pair of diametrically opposed parallel grooves defined by projections formed in the cylindrical portion of said casing, said grooves being parallel with the longitudinal axis of said cylindrical portion, said projections being received within said notches, and a strip of nonmagnetic material disposed in each of said grooves to define capillary spaces with at least one wall defining each of said grooves to remove lubricating fluid from said cylindrical portion.

8. The motor of claim 7 wherein said casing includes a groove across one end of said cylindrical portion interconnecting said pair of grooves and wherein said strip is a U-shaped member extending throughout all of said grooves.

9. A two-pole synchronous electric motor of the shaded pole type comprising a field structure defining an opening of circular cross-section, a notch in each pole of said field structure dividing each pole adjacent said opening into two portions, said notches being arranged in diametrically opposed relationship relative to said opening, a shading coil for each of the poles of said motor, the respective shading coil for each pole being disposed in a portion of the notch for the respective pole and enclosing only one portion of said two portions of the pole, a rotatable armature for said motor disposed within said opening, a sealed casing of nonmagnetic material having an enlarged portion and a cylindrical bosslike projection extending from one end of said casing, an annular projection defining an annular groove around said bosslike projection immediately adjacent its junction with the rest of said casing, said bosslike projection except for said annular projection being snugly received in said opening and enclosing said armature, a pair of diametrically opposed parallel grooves defined by longitudinally extending projections formed in the walls of said bosslike projection with corresponding ends of said grooves connected to said annular groove, said longitudinally extending projections being received within said notches, the other ends of said longitudinally extending grooves being connected by an end groove defined in the end of said bosslike projection, and a U-shaped strip of nonmagnetic material disposed in said longitudinal and end grooves to define a capillary space with the walls defining said grooves to remove lubricating fluid from said cylindrical portion, said strip having end portions extending outside said bosslike projection, and a felt member in said casing in contact with said end portions.

10. The electric motor of claim 5 wherein said strip is formed of copper.

References Cited in the file of this patent
UNITED STATES PATENTS

| | | |
|---|---|---|
| 1,430,867 | Warren | Oct. 3, 1922 |
| 1,495,936 | Warren | May 27, 1924 |
| 2,004,866 | Haldeman | June 11, 1935 |
| 2,583,180 | Kronmiller et al. | Jan. 22, 1952 |
| 2,892,100 | Phelon et al. | June 23, 1959 |